United States Patent [19]

Yasuda

[11] Patent Number: 4,827,337

[45] Date of Patent: May 2, 1989

[54] INTER-FRAME DECODING SYSTEM WITH FRAME MEMORIES FOR UNINTERRUPTED CLEAR VIDEO SIGNALS

[75] Inventor: Tooru Yasuda, Tokyo, Japan

[73] Assignee: NEC Corporation, Japan

[21] Appl. No.: 157,745

[22] Filed: Feb. 18, 1988

[30] Foreign Application Priority Data

Feb. 19, 1987 [JP] Japan .................................. 62-34603

[51] Int. Cl.$^4$ ............................................. H04N 7/137
[52] U.S. Cl. ...................................... 358/136; 358/135
[58] Field of Search ........................ 358/136, 135, 133

[56] References Cited

U.S. PATENT DOCUMENTS

| | | | |
|---|---|---|---|
| 4,591,909 | 5/1986 | Kuroda et al. ...................... | 358/136 |
| 4,677,480 | 6/1987 | Kuroda et al. ...................... | 358/136 |
| 4,679,081 | 7/1987 | Tsugane et al. ................. | 358/136 X |
| 4,689,671 | 8/1987 | Ohki et al. ......................... | 358/136 X |
| 4,743,967 | 5/1988 | Takenaka et al. ................... | 358/136 |

*Primary Examiner*—James J. Groody
*Assistant Examiner*—Victor R. Kostak
*Attorney, Agent, or Firm*—Ostrolenk, Faber, Gerb & Soffen

[57] ABSTRACT

A system for decoding a coded inter-frame prediction signal comprises a separating circuit (4) for separating the coded signal into a coded prediction error signal ($b_k$) and a remainder ($r_k$). A decoding circuit (5, 6, 7) generates a decoded prediction error signal $x_k$. A first delay circuit (8) provides the decoded signal with a first delay to produce a first delayed signal. An error detecting circuit (11, 13) detects errors in the decoded signal ($x_k$) and generates an error detection signal which has a high or low level, depending on whether an error has been detected for a given frame. A second delay circuit (10) provides the output of the decoding system with a second delay to produce a second delayed signal. A selecting circuit (14, 9) receives the error detection signal and the first and second delayed signals and selects one of the latter to produce the output of the decoding system.

14 Claims, 3 Drawing Sheets

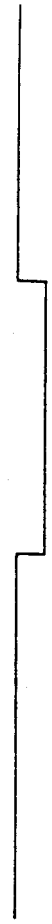
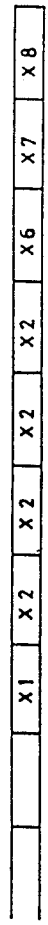
Fig. 3A  FRAME SYNC SIGNAL (F)
Fig. 3B  DECODED SIGNAL xK
Fig. 3C  NON-COINCIDENCE SIGNAL
Fig. 3D  OUTPUT OF MEMORY 8
Fig. 3E  SELECTION SIGNAL (S)
Fig. 3F  OUTPUT OF SELECTOR
Fig. 3G  OUTPUT OF MEMORY 10

INTER-FRAME DECODING SYSTEM WITH FRAME MEMORIES FOR UNINTERRUPTED CLEAR VIDEO SIGNALS

BACKGROUND OF THE INVENTION

The present invention relates to an inter-frame decoding system for television signals and more particularly, to an inter-frame decoding system wherein a frame in which an error is detected is replaced by the preceding frame stored in a frame memory.

An inter-frame encoding/decoding system compresses the transmission band width by transmitting an estimated error only, with a decoded digital television signal of a preceding frame as a predicted value. This requires for reproduction that the predicted value produced by an inter-frame encoder be in agreement with the predicted value of an inter-frame decoder. When a decoded error has occurred in the digital television signals decoded by the inter-frame decoder due to a transmission error, the error remains in the decoded digital television signals unless it is corrected by some method. Therefore, the detection of a transmission error, or the detection of the fact that the predicted value of the decoder is different from the predicted value of the encoder, is important in the inter-frame encoding/decoding system.

An inter-frame decoding system capable of detecting such a transmission error is described in U.S. Pat. No. 4,677,480. This prior art system, however, does not solve the problem of how to cope with the situation after a transmission error has been detected. One of the prior art techniques to cope with the decoded error is that until the transmission error disappears, the picture of the same frame in which an error has been detected is repeatedly read out from a frame memory which stores an inter-frame decoded signal. Another prior art technique is that upon detection of the transmission error, the output picture is made blank until the transmission error disappears. However, the former technique has the disadvantage that the picture containing the error is continuously displayed, while the latter makes the picture unpleasant to the viewer because of the discontinuance of the display.

SUMMARY OF THE INVENTION

An object of the present invention is to provide an inter-frame decoding system which is capable of producing an uninterrupted clear video signal even when a transmission error in the decoded signal is detected.

A decoding system of the present invention for an inter-frame prediction coded signal comprises a decoder for decoding the inter-frame prediction coded signal to generate a decoded signal. A first delay circuit gives the decoded signal a first delay. An error detector generates an error detection signal upon the detection of an error in the decoded signal. A second delay circuit gives an output of the decoding system a second delay. In response to the error detection signal, a selector selects one of the outputs of the first and second delay circuits to produce the output of the decoding system.

BRIEF DESCRIPTION OF THE DRAWINGS

The above and other objects, features and advantages of the present invention will become apparent from the following detailed description when taken with the accompanying drawings, in which:

FIGS. 3A to 3G show time charts for explaining the operation of the embodiment of the present invention.

DETAILED DESCRIPTION OF THE PREFERRED EMBODIMENT

Figure 1:
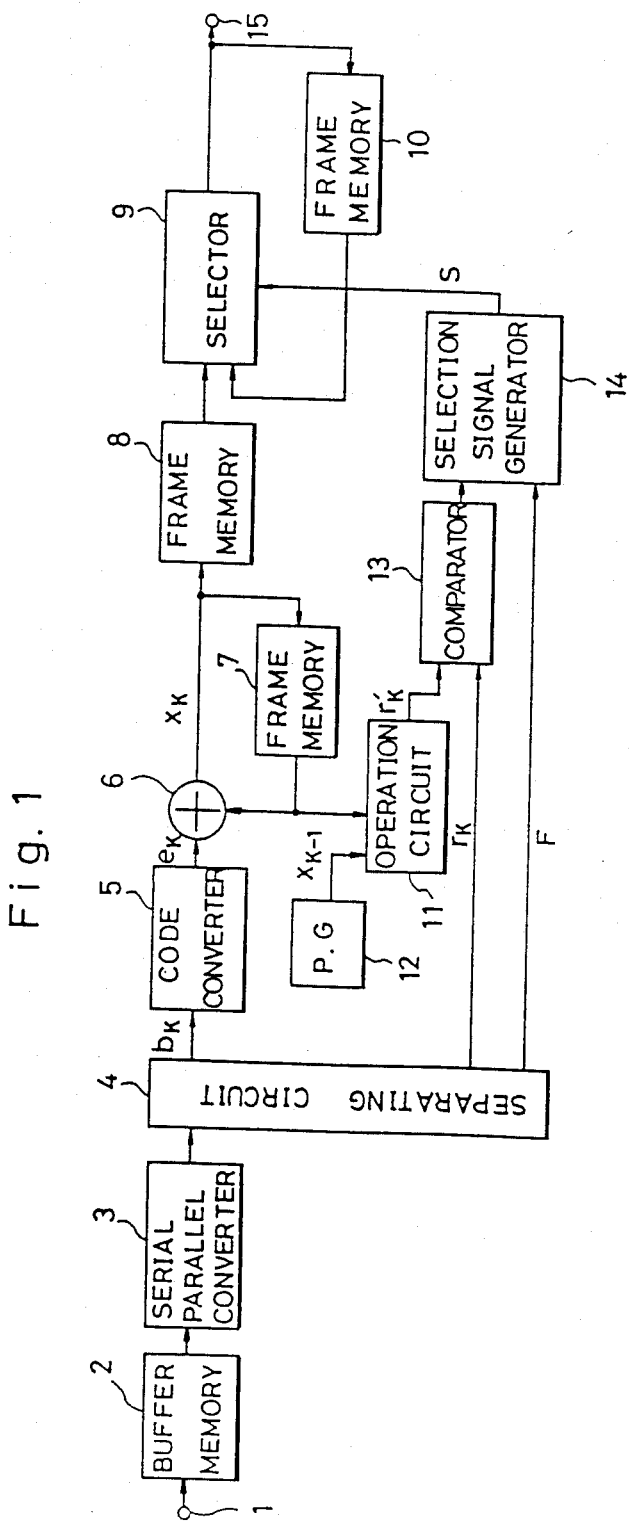
FIG. 1 is a block diagram illustrating an embodiment of the present invention.

Referring to FIG. 1, which is a block diagram illustrating an embodiment of the present invention, a coded video signal transmitted via a transmission line is inputted serially to an input terminal 1. The coded video signal, which is produced by, for example, an encoder described in U.S. Pat. No. 4,677,480, contains a coded prediction error signal $b_k$, a frame synchronizing signal F and a remainder $r_k$ for error detection, where the suffix k denotes the frame number. The coded video signal is temporarily stored in a buffer memory 2 and then sent to a serial/parallel converter 3, at which it is converted into a parallel form and then sent to a separating circuit 4. The separating circuit 4 separates the coded prediction error signal $b_k$, the frame synchronizing signal F and the remainder $r_k$ from the received video signal, which are sent to a code converter 5, a selection signal generator 14 and a comparator 13, respectively. In the converter 5, the coded prediction error signal b, is subjected to reverse conversion, relative to that of the corresponding code converter in an inter-frame encoding system, to produce a prediction error signal $e_k$. An adder 6 adds the decoded prediction error signal $e_k$ to a prediction signal $x_{k-1}$ which has been stored in a frame memory 7, and produces a decoded television signal $x_k$, which is placed in the frame memory 7. The decoded signal $x_k$ is delayed by two frame periods by means of a frame memory 8 and then sent to a selector 9. An operation circuit 11 divides the prediction signal $x_{k-1}$ by a predetermined value to calculate a remainder $r'_k$ in synchronization with a train of pulses supplied from a pulse generator 12, which is then used for detection of errors in the signal $x_{k-1}$. The comparator 13 compares the transmitted remainder $r_k$ with the remainder $r'_k$ calculated by the operation circuit 11 and then sends to the selection signal generator 14 a coincidence signal "0" or a non-coincidence signal "1" according to whether two remainders are coincident or not, respectively. The selection signal generator 14 sends to the selector 9 a selection signal s in response to the non-coincidence signal, at a point in time determined by the synchronizing signal F. In response to the selection signal s, the selector 9 selects one of the outputs of the frame memories 10 and 8, as the output of the decoding system, said output being placed in the frame memory 10.

The separating circuit 4, operation circuit 11, code converter 5 and comparator 13 can be constructed in the same way as the corresponding components described in U.S. Pat. No. 4,677,480 which is incorporated herein by reference, and thus the detailed explanation of these elements will be omitted.

Figure 2:
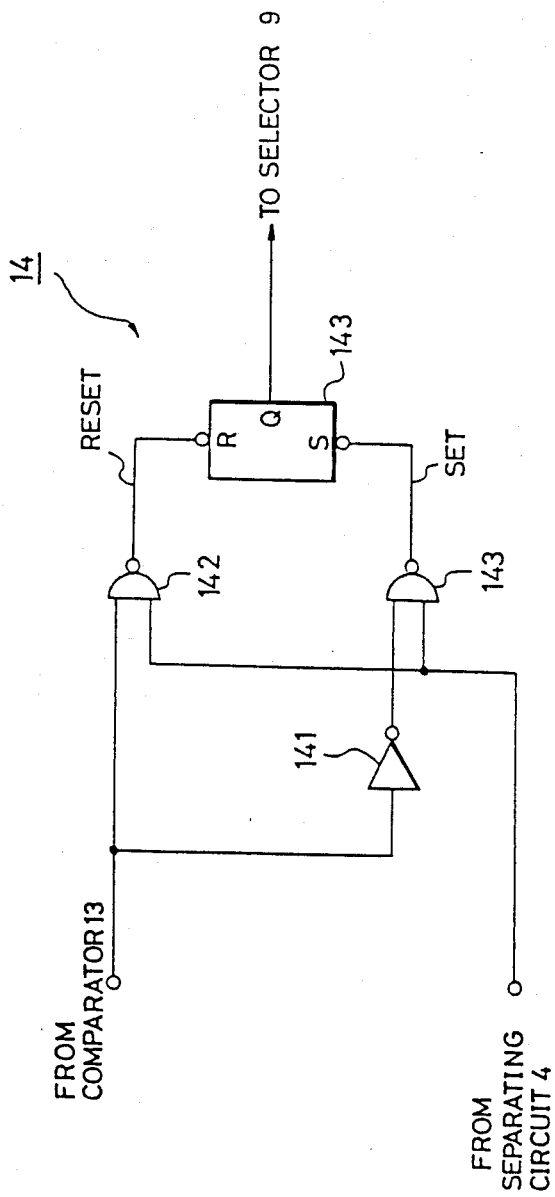
FIG. 2 is a circuit diagram of a selection signal generator.

Referring to FIG. 2, the selection signal generator circuit 14 is composed of an inverter 141, NAND gates 142 and 143, and an R-S flip flop (F/F) 143. The F/F 143 outputs the selection signal "0" in response to the non-coincidence signal "1" and outputs the selection signal "1" in response to the coincidence signal "0" (FIG. 3E).

Now, referring to FIGS. 3A to 3G, the operation of the decoding system will be described. FIG. 3A shows the frame synchronizing signal F, where the encircled numerals denote the frame numbers. Assume that the transmitted remainders $r_k$ ($r_4$, $r_5$, $r_6$) at frames 4, 5 and 6 are different from in the same way remainders $r'_k$ ($r'_4$, $r'_5$, $r'_6$) obtained in the decoding system, respectively. Since the remainder $r'_k$ is calculated based on the decoded signal $x_{k-1}$, it is assumed that the decoding errors occurred in the decoded signals $x_3$, $x_4$ and $x_5$. At frame 4, the comparator 13 compares the remainder $r_4$ transmitted as an error check signal of the decoded signal $x_3$ with the remainder $r'_4$ calculated by the operation circuit 11 and then outputs the non-coincidence signal "1" indicating the result of the comparison at next frame 5 (FIG. 3C). Similarly, the comparator 13 outputs the non-coincidence signals "1" at frames 6 and 7, which corresponds to the errors in the decoded signal $x_4$ and $x_5$, respectively. Thus, the selection signal generator 14 generates the selection signal "0" at frames 5, 6 and 7 (FIG. 3E). Assuming that the selector 9 selects the output of the frame memory 8 in response to the selection signal "1", at frames 3 and 4 before the detection of the error, the selector 9 outputs the decoded error-free signals $x_1$ and $x_2$ at terminal 15 (FIG. 3F) read out from the frame memory 8. Those decoded signals $x_1$ and $x_2$ are also supplied to the frame memory 10 and then again supplied to the selector 9 after being delayed by one frame period (FIG. 3G). At frame 5 where the error of the decoded signal $x_3$ (FIG. 3D) is detected, the selector 9 is responsive to the selection signal "0" to select the signal $x_2$ stored in the memory 10. The selected decoded signal $x_2$ is supplied to the memory 10 again. Similarly, at frames 6 and 7 where the selection signal continues "0", the decoded signals $x_4$ and $x_5$ are not selected at selector 9 and the decoded signal $x_2$ read out from the frame memory 10 is selected instead. Subsequently, since the selection signal returns to "1" at frame 8, the selector 9 selects the error-frame decoded signal $x_6$ from the frame memory 8.

In the embodiment mentioned above, though the remainder $r_k$ is calculated based on the output of the frame memory 7, it could instead be calculated based on the input of the frame memory 7. In this case, the delay of the frame memory 8 should be one frame period.

According to the present invention, as is explained above, when the transmission error is detected, the decoded signal of the preceding frame is outputed instead of the decoded signal containing errors, with the result that the error-free clear television signal can be obtained.

What we claim is:

1. A decoding system for an inter-frame prediction coded signal comprising:
    decoding means for decoding said inter-frame prediction coded signal to generate a decoded signal;
    first delaying means for providing said decoded signal with a first delay to produce a first delayed signal;
    error detecting means for detecting an error in said decoded signal and for generating an error detection signal upon detection of an error in said decoded signal;
    second delaying means for providing an output of said decoding system with a second delay to produce a second delayed signal; and
    selecting means responsive to said error detection signal for selecting one of said first and second delayed signals to produce said output of the decoding system.

2. A decoding system as in claim 1, wherein said decoding means comprises third delaying means for providing said decoded signal with a third delay to produce a third delayed signal.

3. A decoding system as in claim 3, wherein said decoding means further comprises:
    a code converter which receives said inter-frame prediction coded signal and decodes it to generate an inter-frame prediction signal; and
    an adder which combines said third delayed signal with said inter-frame prediction signal to produce said decoded signal.

4. A decoding system as in claim 2, wherein said third delaying means comprises frame memory means for providing said decoded signal with a one-frame-period delay.

5. A decoding system as in claim 4, wherein said first delaying means comprises frame memory means for providing said decoded signal with a two-frame-period delay.

6. An inter-frame decoding system for decoding an encoded signal containing a prediction coded signal and a first error check code which is related to said prediction coded signal, comprising:
    separator means for separating said prediction coded signal and said first error check code from said encoded signal;
    decoding means for decoding said prediction coded signal to generate a decoded signal;
    error check code generator means for generating a second error check code from said decoded signal;
    error detecting means responsive to said first and second error check codes for detecting an error in said decoded signal to generate an error detection signal;
    first delaying means for providing said decoded signal with a first delay to produce a first delayed signal;
    second delaying means for providing an output of said decoding system with a second delay to produce a second delayed signal; and
    selector means responsive to said error detection signal for selecting one of said first and second delayed signals to produce the output of said decoding system.

7. A decoding system as in claim 2, wherein said decoding means comprises third delaying means for providing said decoded signal with a third delay to produce a third delayed signal.

8. A decoding system as in claim 7, wherein said decoding means further comprises:
    a code converter which receives said prediction coded signal and decodes it to generate a prediction signal; and
    an adder which combines said third delayed signal with said prediction signal to produce said decoded signal.

9. A decoding system as in claim 7, wherein said third delaying means comprises frame memory means for providing said decoded signal with a one-frame-period delay.

10. A decoding system as in claim 9, wherein said first delaying means comprises frame memory means for providing said decoded signal with a two-frame-period delay.

11. A decoding system as in claim 2, wherein said error detecting means comprises a comparator which receives and compares said first error check code and said second error check code and generates said error detection signal which indicates the result of said comparison.

12. A decoding system as in claim 11, wherein said error detection signal has a first value when said first and second error check codes coincide, and a second value when said first and second error check codes do not coincide.

13. A decoding system as in claim 12, wherein said separator means also separates a frame synchronizing signal from said encoded signal; and said selector means further comprises a selection signal generator which receives said error detection signal and said frame synchronizing signal and generates a selection signal which is responsive to said frame signal and indicates whether said error detection signal has said first value or said second value.

14. A decoding system as in claim 13, wherein said selector means further comprises a selector which receives said first and second delayed signals and said selection signal, and selects one of said first and second delayed signals to produce the output of said decoding system, said selector being responsive to whether said error detection signal has said first value or said second value.

* * * * *